United States Patent
Wilson et al.

(10) Patent No.: US 10,140,328 B2
(45) Date of Patent: Nov. 27, 2018

(54) DETECTING DATA INTEGRITY ERRORS IN INFORMATION COMPRISING SIMILAR DATA ELEMENT TYPES MAINTAINED BY DISSIMILAR INFORMATION SYSTEMS

(71) Applicants: Jason Wilson, Toronto (CA); Irving Whynder, Brampton (CA)

(72) Inventors: Jason Wilson, Toronto (CA); Irving Whynder, Brampton (CA)

(73) Assignee: Globestar Systems, Inc

( * ) Notice: Subject to any disclaimer, the term of this patent is extended or adjusted under 35 U.S.C. 154(b) by 359 days.

(21) Appl. No.: 14/962,243

(22) Filed: Dec. 8, 2015

(65) Prior Publication Data

US 2017/0161312 A1  Jun. 8, 2017

(51) Int. Cl.
G06F 17/00 (2006.01)
G06F 17/30 (2006.01)
H04L 29/08 (2006.01)

(52) U.S. Cl.
CPC .. G06F 17/30371 (2013.01); G06F 17/30312 (2013.01); H04L 67/12 (2013.01); H04L 67/26 (2013.01)

(58) Field of Classification Search
CPC ......... G06F 17/30312; G06F 17/30371; H04L 67/12; H04L 67/26
USPC ....................................... 707/687, 690, 691
See application file for complete search history.

(56) References Cited

U.S. PATENT DOCUMENTS

| | | | | |
|---|---|---|---|---|
| 9,275,338 B2* | 3/2016 | Noel | ...................... | G06F 9/542 |
| 2006/0229551 A1* | 10/2006 | Martinez | ............... | A61M 5/172 |
| | | | | 604/67 |
| 2008/0140962 A1* | 6/2008 | Pattabiraman | ........ | G06F 11/167 |
| | | | | 711/162 |
| 2012/0079004 A1* | 3/2012 | Herman | .................. | H04L 67/26 |
| | | | | 709/203 |
| 2013/0163438 A1* | 6/2013 | Wilkinson | .............. | H04L 43/50 |
| | | | | 370/242 |
| 2013/0326620 A1* | 12/2013 | Merza | ................. | H04L 63/1408 |
| | | | | 726/22 |
| 2014/0207592 A1* | 7/2014 | Kavis | ..................... | G06Q 40/12 |
| | | | | 705/21 |
| 2014/0310683 A1* | 10/2014 | McCarty | .................. | G06F 8/20 |
| | | | | 717/105 |

* cited by examiner

*Primary Examiner* — Phong H Nguyen
(74) *Attorney, Agent, or Firm* — Robert Schuler

(57) ABSTRACT

An event notification system has an information system interface that operates to receive critical patient information in messages from dissimilar information systems. The information system interface has functionality that parses information in each message (including the critical information), detects from which information system the message are sent, and operates to detect critical information in each message. Critical information detected in a message received from a core information system is stored and compared to critical information (that should be the same as at least some of the stored critical information) detected in a message received from a non-core information system to determine whether the information is the same.

17 Claims, 6 Drawing Sheets

PRIOR ART

FIG. 4A

CORE INFORMATION SYSTEM
MESSAGE 400 FORMAT

HEADER → MSH|^~\&|HL7 Simulator|General Hospital|Connexall HIC|General Hospital|200705101447|2058|ADT^A01|3789975|D|2.3

EVENT DATA → EVN|A01|200705101447

PATIENT ID → PID||MRN12345^^^2^EPI^|||DOE^JANE^^^^^

PATIENT VISIT → PV1|||4N^RM 101^BED 01^^^^^^|||
DATA
DG1||||Inflamed gall bladder

FIG. 4B

NON-CORE INFORMATION
SYSTEM MESSAGE 410
FORMAT

HEADER → MSH|^~\
&|HL7|MMS|||20140312143300||ORU^R01|cf66b:144b7812ed8:7d
02:
12170776|P|2.3||||||8859/1
PATIENT ID → PID|||001234567^^^A^P||DOE^JANE
PATIENT VISIT → PV1||E|ZB05S004A|||RM 101^BED 01^^^|||
DATA
OBR|1||||||20140312143300
OBX|1|ST|HR||80|/min|||||R
OBX|2|ST|PVC||5|#/min|||||R
OBX|3|ST|STI||0.4|mm|||||R
OBX|4|ST|STII||1.4|mm|||||R
OBX|5|ST|STIII||1.5|mm|||||R
OBX|6|ST|STV1||1.1|mm|||||R
OBX|7|ST|STAVR||1.0|mm|||||R
OBX|8|ST|STAVL||0.6|mm|||||R
OBX|9|ST|STAVF||1.4|mm|||||R

FIG. 5

STORE 230 RECORD
(RM101) FORMAT

| ENTRY.1 | ENTRY.2 | ENTRY.3 |
|---------|---------|---------|
| RM101 | PID=JANE DOE | MRN=12345 | ent in which it is desirable to maintain information that can
DETECTING DATA INTEGRITY ERRORS IN INFORMATION COMPRISING SIMILAR DATA ELEMENT TYPES MAINTAINED BY DISSIMILAR INFORMATION SYSTEMS

1. FIELD OF THE INVENTION

The present disclosure relates to dissimilar systems, each of which can maintain similar information in a different format, and to a notification system that detects data errors in the similar information maintained by the dissimilar systems.

2. BACKGROUND

Computer information systems generally operate to receive and to maintain information, and to allow access to this information by system users. Such information systems can be designed to operate in business environments, financial environments, healthcare environments, or any environment in which it is desirable to maintain information that can be accessed by one or more information users. Such information systems can include one or more network servers running applications or processes that can operate to manipulate information received by the information systems, and to make the information maintained by the information system available to the system users in order to perform some activity. An information system can receive information from one or more electronic devices that are connected (hardwired or wireless) to the system servers and/or other information systems that share the data. Information received by an information system is typically maintained in files or records, and computer applications are designed to run on the user devices connected to the information system that are able to gain access to this information and to operate on the information in the format in which it is received from the information system.

As indicated above, information systems can be designed to maintain information and to make this information available to users in a particular format. Further, one information system designed by an organization can make information available to users in a format that is different or dissimilar than a format in which another information system maintains information and makes it available to a user. As user applications are typically designed to receive information in only one format, it is necessary to purchase and run multiple applications on user devices in order to receive information from multiple dissimilar information systems. In order to minimize the number of applications needed to access information from dissimilar systems, information system interface engines have been designed that operate to receive information in dissimilar formats, and convert this information to a standard format so that it can be operated on by a single user application. In this regard, FIG. 1 shows multiple dissimilar information systems (System.1 to System.N) connected to an interface engine or function, which is in turn connected to a communication system that is accessible by a number of different electronic devices. In this configuration, it is possible for an individual to interact with a single application running on an electronic device in order to gain access to information maintained by any one of the information systems.

3. BRIEF DESCRIPTION OF THE DRAWINGS

FIG. 4A illustrates the format of a core information system message 400.

FIG. 4B illustrates the format of a non-core information system message 410.

FIG. 5 illustrates the format of a record (RM101) maintained in a store 230.

4. DETAILED DESCRIPTION

Figure 1:
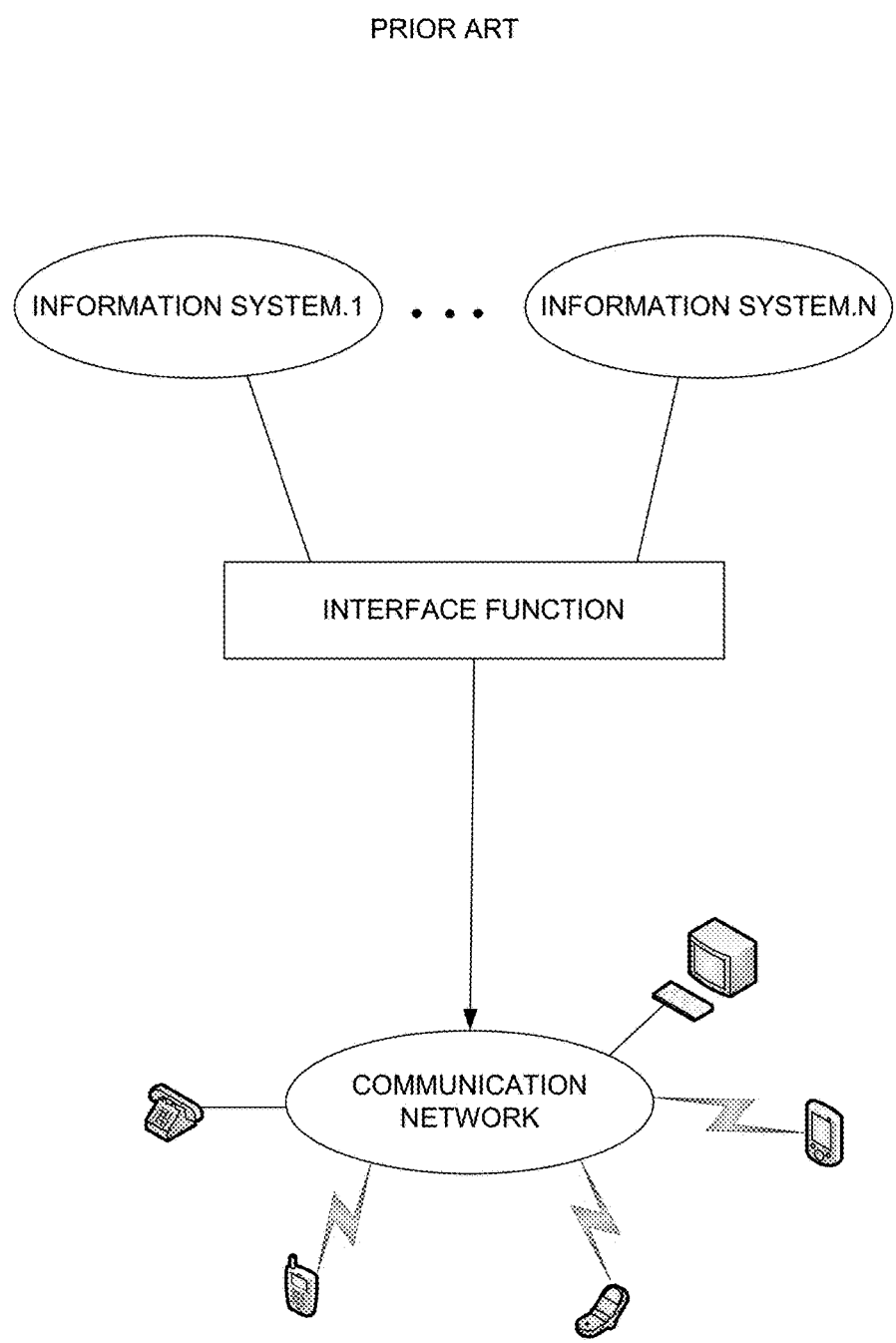
FIG. 1 is a diagram showing a prior art healthcare network having multiple dissimilar information systems connected to an interface function.

Some large organizations or enterprises, such as a healthcare organization, maintain a plurality of separate and dissimilar information systems. Healthcare organizations can have separate information systems to maintain patient Admission, Discharge and Transfer (ADT) information, patient orders information, lab result information, radiology information, cardiology information, pharmaceutical information, and other information. Personnel assigned to different departments within an organization are typically responsible for entering new information into and updating existing information in a single information system, such as a radiology information system. In organizations that maintain a plurality of information systems typically some of the information entered into one information system can be the same as information entered into another information system. For example in a healthcare organization, the same patient name and corresponding patient medical record number (MRN) can be entered by different departments into multiple, dissimilar information systems. Over time, as the same information is entered by different personnel into the multiple, dissimilar information systems, it is possible that incorrect information (incorrect patient name or MRN) can be entered into one of the systems in error. At one end of the spectrum, running information systems that have erroneous information can be merely disruptive to the operation of an organization, and at the other end of the spectrum in certain organizations, running information systems having incorrect information can have catastrophic consequences to the operation of the organization or to clients and customers of that organization.

Accordingly, it would be beneficial to proactively, and in near real-time, confirm the integrity of information maintained by two or more dissimilar systems by identifying information that is entered into an information system in error before the information can have a disruptive or catastrophic effect on an organization. Such information maintained by information systems is referred to herein as critical information. We discovered that it is possible to identify information entered erroneously into one information system with respect to information that is correctly entered into another, dissimilar information system. In one embodiment, an instance of critical information maintained by a first information system is received by a notification system and compared to an instance of critical information maintained by a second dissimilar information system that should be the same as the instance of critical information maintained by the first information system, and if the two instances of critical information are not compared to be the same, than a message is generated and sent to an individual or a group in the organization alerting them to the possibility that one or the other of the information systems has an erroneous instance of critical information. This comparison of instances of critical information maintained by two dissimilar information systems can occur in near real-time as soon as a message having critical information is received by the notification system. More specifically, the notification system can operate to identify and store at least one instance of critical information maintained by a first information system, and it can operate to detect an instance of critical information received from a second information system that should be the same as the instance of critical information maintained by the first information system, and then compare the two instances of critical information. If the two instances of critical information are not compared to be the same, the notification system can generate and send a message to an appropriate individual alerting them to the possibility that one of the information systems may be maintaining erroneous information. Such a notification system is described below with reference to FIG. 2.

Figure 2:
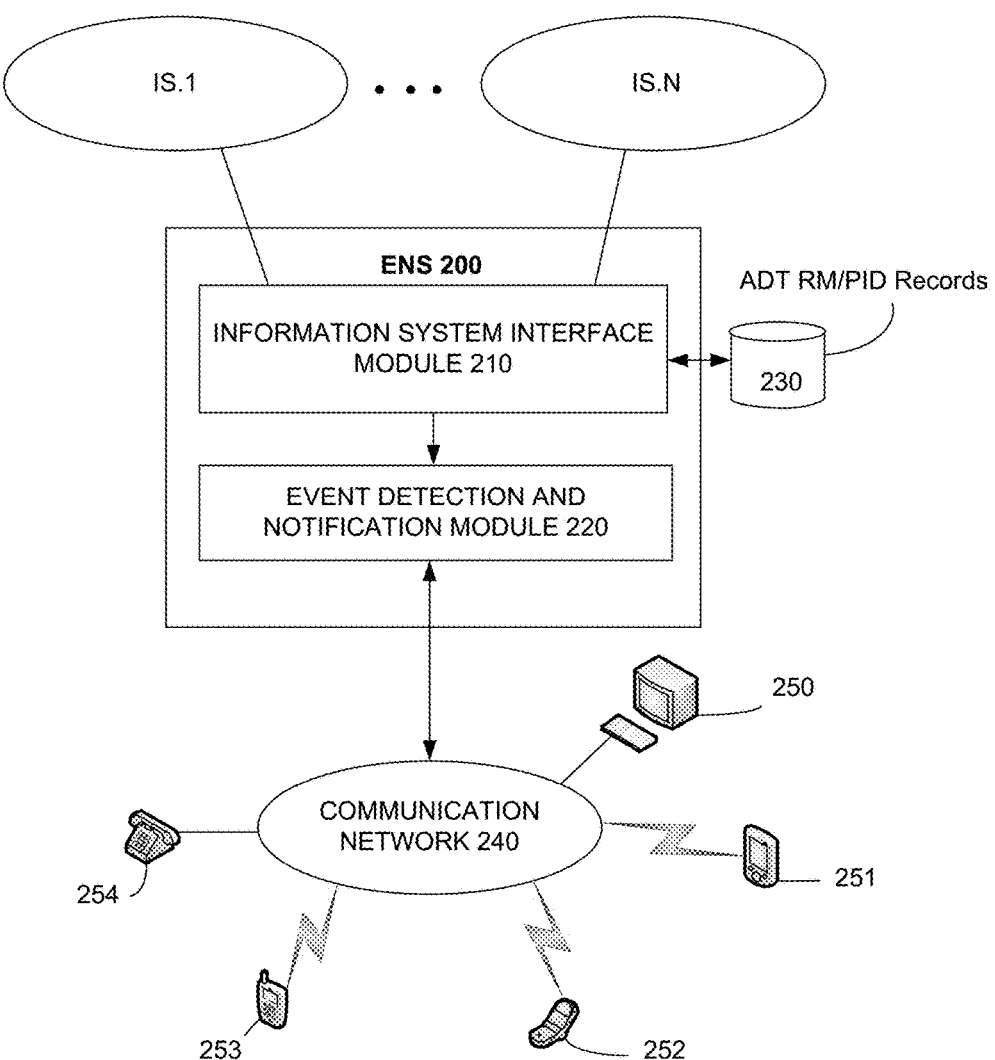
FIG. 2 is a diagram showing multiple dissimilar information systems connected to an event notification system.

FIG. 2 shows multiple different information systems (IS), IS.1 to IS.N at least two of which are dissimilar. A dissimilar IS in the context of this description means that the format in which information is made available by one IS is different than the format that information is made available to a user by another IS. This information can be made available to one or more individuals with access to the IS, or the information can be made available to other computer systems, such as an event notification system (ENS) 200. Some information systems can be configured as core information systems that maintain information which is shared with other information systems, referred to here as non-core or satellite information systems. One type of core IS is an Admission, Discharge and Transfer (ADT) system. An ADT system typically maintains critical information such as a patient name, corresponding medical record number, patient ID, and patient room number (RN) and other critical patient information. An IS can make critical information available in a message that is created as the result of an event or as the result of an interaction a system user has with the IS. In this regard, a patient monitoring system can detect a patient physiological event (low heart rate, low blood oxygen level, or respiration drops below acceptable level), and send this clinical information with critical information in a message to the ENS 200, and the ENS 200 can determine that the event should be reported, and generate an alert that is sent to one or more appropriate staff members. Or, a radiologist can enter information (radiology report) about a particular patient into a radiology information system, the identity of the report can be sent in a message with critical information to the ENS, and the ENS 200 can determine whether to alert staff to the results of the radiology report or not.

Continuing to refer to FIG. 2, the ENS 200 has, among other things, an information system interface (ISI) module 210 and an event detection and notification module 220. The ISI 210 generally operates to receive messages with information in dissimilar formats, parses the information in the messages in order to detect information of interest (critical information) and then maps the critical information into a standard format that allows the ENS 200 to operate on the information, and identifies the message type. According to one embodiment, described in more detail herein below, a single ISI 210 can operate to parse and map messages with a plurality of different data formats. In another embodiment, multiple ISIs can be implemented to parse and map information comprising a particular message type. Message types in the context of this description can mean a formatted (i.e., HL7) message generated by different information systems (ADT, radiology, cardiology, patient monitoring systems). The ISI 210 described with reference to FIG. 2 is configured to receive messages from a core information system such as an ADT system, and to receive messages from a non-core IS, such as a cardiology system. The ISI can operate to parse information in a message received from the ADT system in order to detect critical information (i.e., patient name and corresponding medical record number) and then maintain this critical patient information in a store or data repository 230, and the ISI can operate to parse information in a message from the cardiology IS in order to detect critical information. The store 230 can be any appropriate non-volatile storage device to which the core ISI 210 can write to and read the critical information from. A more detailed description of the ISI 210 operation is included later with reference to FIG. 3.

The event detection and notification module (EDN) 220 in FIG. 2 generally operates to receive messages from event generation devices or systems, determine whether or not the event warrants generating and sending an alert message to clinical staff, and operates to determine to which clinical staff the alert message should be sent. A more detailed description of this EDN 220 functionality is included in U.S. Pat. No. 8,996,630 entitled, "An Event Notification System for Associating an Outgoing Electronic Message with an Incoming Response", the entire contents of which are incorporated herein by reference. The design and operation of an interface module, such as the ISI 210 is well known to network engineers, and so the detailed operation of this module will not be described here further.

The ENS 200 described above with reference to FIG. 2 can operate on information in messages received from any of the information systems, IS.1 to IS.N, to generate and send alert messages to appropriate individuals. And finally, FIG. 2 shows a communication network 240 that is configured to support bi-directional communication between the ENS and multiple mobile or stationary communication devices 250-254. If the ENS 200 is operating in a healthcare setting, any of the devices 250-254 can be assigned to healthcare staff members so that they are able to receive alert messages.

The operation of the ISI 210 will now be described with reference to FIG. 3. As described earlier, the information system interface (ISI) module 210 generally operates, according to one embodiment, to determine whether an instance of critical information received in a first message from a core information system is the same or similar to an instance of critical information received in a second message from a non-core information system. Each message sent by a core or non-core information system can have both non-critical and critical information, and each message can have a number of distinctly different categories or types of critical information. Further, each different category/type of critical information can have one or more critical information instances that can be uniquely identified by the ISI 210. For example, a Health Level 7 (HL7) message can have a number of different segments, with each individual segment having a unique identifier. Further, each different type of segment can have information in a sub-segment that is either uniquely identified or which sub-segment is located in a particular position within the segment. For example, one message segment can have the identifier "PV1" and the PV1 segment can have a critical information instance in a sub-segment labeled RM101 (as shown in FIG. 4A). Examples of other different critical information categories in an HL7 message can be labelled, but are not limited to such labels, MSH, PID, EVN or OBX. As described above, one or more critical information instances can be included in a message sent by an information system, and as will be illustrated later with reference to FIGS. 4A and 4B, messages sent by different information systems can include critical information that is formatted differently. In the event that an instance of critical information of a particular type received in a message from one information system (core information system) is compared to be different than an instance of critical information of the same type received in a message from another information system (non-core information system), and both instances of the critical information should be the same (i.e., same patient name, same patient room number, same patient MRN), then the ENS 200 can generate and send a message to an appropriate staff member alerting them to a possible data integrity problem between the core and the non-core information systems. Alternatively, and in another embodiment, the comparison of critical information can occur between messages received from two different non-core systems, or between two different core systems.

Figure 3:
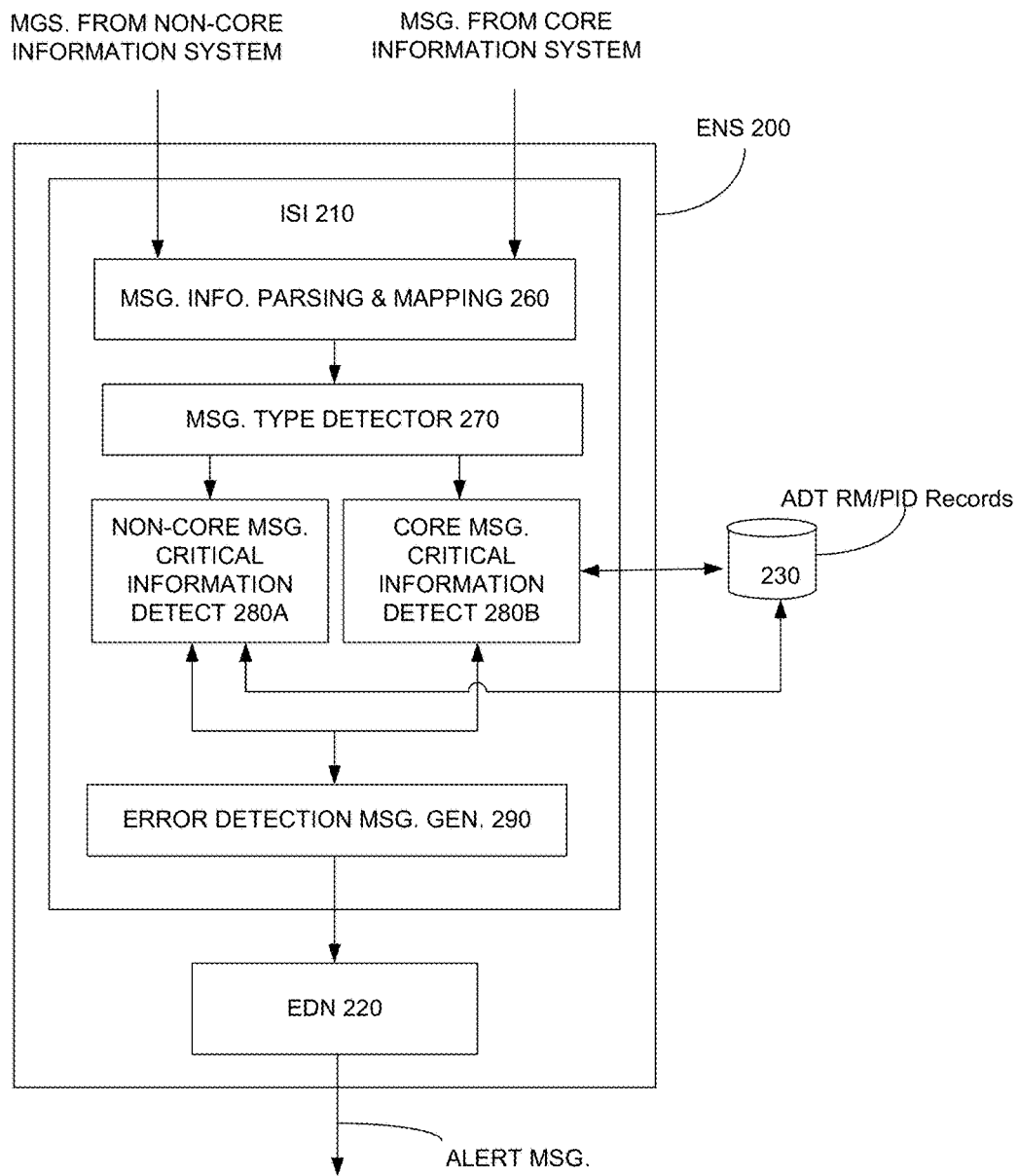
FIG. 3 is a diagram showing the ENS of FIG. 2 with detail of the interface function.

The ISI 210 shown in FIG. 3 has message information parsing and mapping function 260, a message type detection function 270, it has a non-core and a core message critical information detection function 280A and 280B respectively, and it has an error detection message generation function 290. For the purpose of this description, it is assumed that a single ISI 210 receives messages in different formats from any type of information system. In this regard, the parsing and mapping function 260 receives messages from both core and non-core type information systems, parses the information in each message to determine what type of information is in the message, and maps each instance the information type in a message to a standard message format that the ISI can operate on. The message format in which information is arranged in a core (i.e., ADT) information system and the message format in which information is arranged in a non-core type information system is described later with reference to FIGS. 4A and 4B respectively. The message type detector 270 can examine the parsed and mapped message information in order to determine whether the message is from a core or a non-core information system, and then provide an indication to the critical information detectors as to the type of message that is received, or it can provide the parsed message information to the appropriate critical information detector 280A or 280B. In the event of a message is determined to be from a core information system, the critical information detector function 280B examines the parsed message information for two or more different types of critical information of interest (i.e., patient name, MRN, corresponding patient RM, etc.), and (for each message) if two or more different types of the critical information instances of interest are detected, information comprising each of these instances of critical information can be sent to and maintained in a record/file in the store 230 for later use. The format of such a record is described later with reference to FIG. 5. Each record maintained in the store 230 can be uniquely identified with a label that includes critical information comprising a selected one of the critical information types (i.e., any one of a patient room number (RM), a corresponding patient name (Jane Doe), a corresponding medical record number (MRN), etc.) detected in the message. So for example, a record maintained in the store 230 can be labelled as RM101. On the other hand, if the message is determined by the detector 270 to be from a non-core information system, then the function 280A examines the parsed message information for a KEY critical information type that is the same critical information type as the one critical information type selected for labelling the records maintained in the store 230. The detector 280A also examines the same non-core message for information comprising other critical information types, such as a patient name, MRN, etc. If it detects the selected one critical information type and at least one other critical information type, it uses critical information comprising the detected and selected one critical information type to search the records maintained in the store 230 for similar critical information. For example, if the selected one critical information type used to label at least some of the records maintained in the store 230 is a room number (RM), then the detector 280A uses KEY critical information in the non-core message (which can be RM101 for instance) to search the records maintained in the store 230 to determine if a record labelled RM101 exists. If it is determined that a stored record labelled RM101 does exist, then the detector 280A can compare other critical information detected in the non-core message with critical information stored in the record RM101. This other critical information can be a patient name, for example. If the detector 280A determines that the patient name in the non-core message is not the same as the patient name in the record labelled RM101, then it can notify the error detection message generation function 290 of this condition, and the function 290 can send a message to the EDN 220 indicating that there is a critical information error between the non-core information system and the core information system (which in this case is a patient name error relating to RM101.

As described earlier, FIG. 4A shows a core type information system message 400 having information formatted according to the Health Level 7 (HL7) standard. This message is generated by an ADT system, but it could be generated by any core type information system. The ADT message 400 has a message header segment, MSH, an event data segment, EVN, a patient identification segment, PID, and a patient visit segment, PV1. The header segment is comprised of, among other things, information that identifies the message format (which is HL7), and that identifies the sender and receiver of the message (i.e., name of hospital) and the type of information system that generated the message (ADT). The event data segment has information relating the date/time that the message is sent, the patient ID segment has the medical record number (12345) and name of a corresponding patient (JANE DOE), and the patient visit data segment has some details relating to the patient's current visit, which in this case includes the room number (RM101) and the bed number (01). As described earlier with reference to FIG. 3, the function 260 parses and maps the information comprising the message 400 and then the detector 270 identifies the message type as an ADT message, and the detector 280B then examines the information comprising the message 400 segments looking for critical information. The critical information in this case can be the patient medical record number, the patient name and the room and bed number currently assigned to the patient. This critical patient information (PID=JANE DOE & MRN=12345) can then be stored in a record labeled RM101 as described later with reference to FIG. 5.

FIG. 4B shows a non-core type message 410 having information formatted according to the Health Level 7 (HL7) standard. This message is generated by a patient monitoring system, but it could be generated by any non-core type information system. The PID, JANE DOE, is shown to be the same in this message as the PID in the core message of FIG. 4A. And the room and bed numbers are also shown to be the same, RM101 and BED 01 respectively. The remaining segments have patient observational information.

Critical information comprising the record labeled RM101 maintained in the store 230 by the ENS 200 is shown with reference to FIG. 5. The first entry, ENTRY.1, is the record label which is used to identify the record during a search of the records maintained by the ENS200 in the store 230. The record labeled RM101 in this case has the location identity of the patient, JANE DOE, and the patient medical record number corresponding to JANE DOE, which is MRN12345. While the record RM101 only has three instances of critical information, there is no limitation on the number of critical information instances that can comprise a record maintained in the store 230. Such a record can have more or less than three instances of critical information and the record can be comprised of other critical patient information, such as patient prescription information, patient observation information or test result information.

Figure 6:
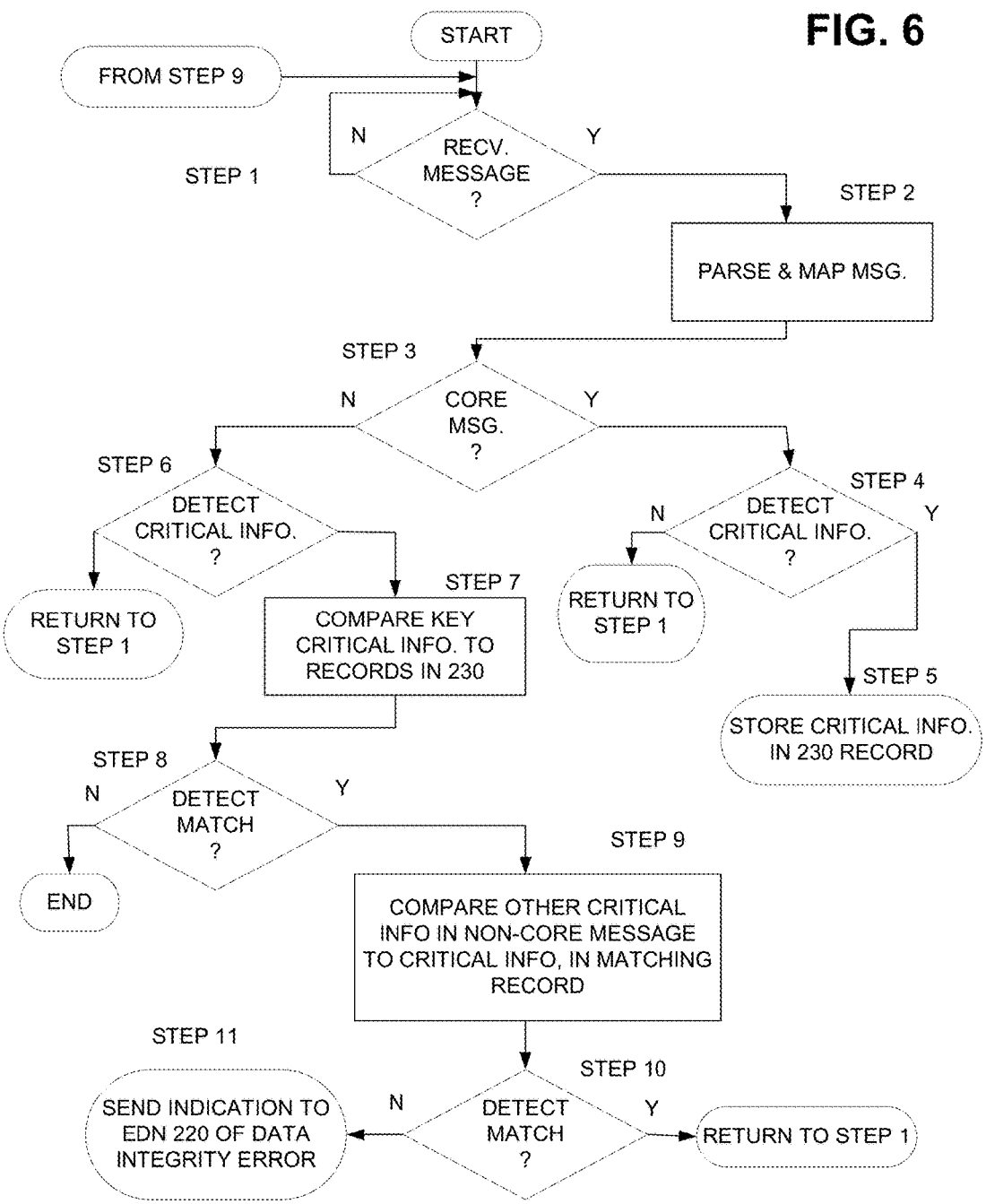
FIG. 6 is a logical diagram showing a data integrity error detection process.

The process by which data integrity errors are detected in critical information maintained by two dissimilar information systems is now described with reference to the logical flow diagram in FIG. 6. While the embodiment described with reference to FIG. 6 is in the context of detecting data integrity errors detected in critical information maintained by a core and a non-core information system, it should be understood that this process can be applied to the detection of data integrity errors between two core information systems or between two non-core information systems. Further, in another embodiment, this process can be extended to detect data integrity errors in critical information maintained by more than two dissimilar information systems, regardless of whether the systems are a combination of core and non-core or all core or all non-core type systems. The process described with reference to FIG. 6 is implemented in computer instructions that can be stored in association with the ISI 210 implemented in the ENS 200, and these instructions can be operated on by the ISI 210 to detect data integrity errors in critical information maintained by the two or more dissimilar information systems.

Referring now to FIG. 6, in Step 1 the ISI 210 receives a message (either core or non-core type message) and in Step 2 the function 260 operates to parse the message information in order to determine what type of information is contained in the message. After parsing the message information, the function 260 maps the information to a standard format which can later be processed by the detection functions 280A and 280B. In Step 3, the message type detector 270 examines that information mapped into the standard format as the result of Step 2, and determines whether the message is generated by a core or a non-core information system. If it is determined that the message is a core message, then the process proceeds to Step 4 and the detection function 280B operates to determine whether or not the message has critical information, and if it does the process proceeds to Step 5 and the detected critical information is stored in a record, such as the record labeled RM101 in FIG. 5, in the store 230. On the other hand, if no critical information is detected in Step 4, then the process returns to Step 1.

Continuing to refer to FIG. 6, if in Step 3 the ISI receives a non-core message, then the process proceeds to Step 6 and the function 280A operates to determine if any critical information (i.e., RM, PID, MRN) is detected in the message, and if so the process proceeds to Step 7 where an instance of key critical information (i.e., RM101) is identified and used as a pointer to a record maintained in the store 230. If in Step 8 it is determined that a record maintained in the store 230 has a label (RM101 for instance) that matches the key critical information, then the process proceeds to Step 9 and at least one instance of other critical information in the non-core message (PID, MRN) is compared to at least one instance of other critical information in the stored record. If in Step 10 there is a match, then the process can return to Step 1, but if a match is not detected, then the process proceeds to Step 11 and the error detection message generator 290 sends an indication to the EDN 220 that data integrity error may exist. In this regard, it is possible from time to time that an individual responsible for entering critical information into a system enters the information in error. It is possible that a room number to which a patient is assigned is entered into a system in error. If this error is not propagated to some or all other information systems in an organization, the data integrity between the systems is compromised. So for example, if in Step 10 the patient name (jane doe) associated with RM101 in the non-core message should match the name associated with the record labeled RM101 (Jane doe) maintained in the store 230, and if function 280A compares these two instances of critical information to be different, then a data integrity error that should be corrected may exist.

The forgoing description, for purposes of explanation, used specific nomenclature to provide a thorough understanding of the invention. However, it will be apparent to one skilled in the art that specific details are not required in order to practice the invention. Thus, the forgoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

We claim:

1. A method of detecting a data integrity error in critical information associated with an individual that is maintained by separate and dissimilar information systems connected to a common network, comprising:

configuring a critical information detector to operate to detect a unique identity associated with each instance of a first and a second type of critical information received in a message from a first or second information system, the critical information detector comprises logical instructions implemented in non-transitory computer readable medium associated with an event notification system running on a computational device connected to the common network;

receiving, at an information system interface comprising the event notification system, a message in a first computer application readable format from a first information system, using a parser to identify separate instances of critical information in the message that are associated with the individual and using the critical information detector to detect a unique identity associated with a first instance of critical information of the first type and a second instance of critical information of the second type among the separate instances of information in the message received from the first information system and creating a record relating to the individual by storing both instances of the critical information in a file in association with each other;

receiving, at the information system interface comprising the event notification system, a message in a second computer application readable format from a second information system, using the parser to identify separate instances of critical information in the message that are associated with the individual and using the critical information detector to detect at least a third instance of critical information of the first type and a fourth instance of critical information of the second type among the separate instances of information in the message received from the second information system, the second message format being different than the first message format;

using, by the event notification system, either the third or the forth instances of critical information as a pointer to the record stored in association with the first information system, and determining by a comparison performed by the event notification system, that there is a difference between data comprising either the first and the third instances of critical information or the second and the fourth instances of critical information; and in response to there being a difference between data comprising either the first and the third instances of critical information or the second and the fourth instances of critical information, generating and sending a message over the network to at least one communication device indicating that the data in any one or more of the four instances of critical information associated with the individual is erroneous.

2. The method of claim 1, wherein each message received by the event notification system from the first and second information systems has message type information.

3. The method of claim 1, wherein the event notification system detects the message type information in each message received from the first and second information systems.

4. The method of claim 2, wherein the message type information is located in a message header.

5. The method of claim 3, wherein the message types detected are any one or more of an admit, discharge, transfer message type, a radiology message type, a cardiology message type, and a patient monitor message type.

6. The method of claim 3, wherein the message type information detected in the message received from the first information system and from the second information system is the same.

7. The method of claim 3, wherein the message type information detected in the message received from the first information system and from the second information system is different.

8. The method of claim 1, wherein the first information system is a core information system and the second information system is a non-core information system.

9. The method of claim 1, wherein each instance of critical information is uniquely identified by either an information label, by a position of the critical information in the message or by both.

10. The method of claim 1, wherein only similar critical information in the messages received from the first and second information systems is compared.

11. A system for detecting data integrity errors maintained by separate and dissimilar information systems connected to a common network, comprising:
    a first and a second information system connected to a network, wherein the first and the second information system maintain information in different computer readable formats; and,
    a computational device that is connected over the network to each of the first and second information systems for:

configuring a critical information detector to operate to detect a unique identity associated with each instance of a first and a second type of critical information received in a message from the first or second information system, the critical information detector comprises logical instructions implemented in non-transitory computer readable medium associated with an event notification system running on a computational device connected to the common network;

receiving, at an information system interface comprising the event notification system, a message in a first computer application readable format from a first information system, using a parser to identify separate instances of critical information in the message that are associated with the individual and using the critical information detector to detect a unique identity associated with a first instance of critical information of the first type and a second instance of critical information of the second type among the separate instances of information in the message received from the first information system and creating a record relating to the individual by storing both instances of the critical information in a file in association with each other;

receiving, at the information system interface comprising the event notification system, a message in a second computer application readable format from a second information system, using the parser to identify separate instances of critical information in the message that are associated with the individual and using the critical information detector to detect at least a third instance of critical information of the first type and a fourth instance of critical information of the second type among the separate instances of information in the message received from the second information system, the second message format being different than the first message format;

using, by the event notification system, either the third or the forth instances of critical information as a pointer to the record stored in association with the first information system, and determining by a comparison performed by the event notification system, that there is a difference between data comprising either the first and the third instances of critical information or the second and the fourth instances of critical information; and in response to there being a difference between data comprising either the first and the third instances of critical information or the second and the fourth instances of critical information, generating and sending a message over the network to at least one communication device indicating that the data in any one or more of the four instances of critical information associated with the individual is erroneous.

12. The system of claim 11, wherein the event notification system has a message type detector for detecting message type information in each message received from the first and second information systems.

13. The system of claim 11, wherein the first information system is a core information system and the second information system is a non-core information system.

14. The system of claim 12, wherein different message types are received from different types of information systems.

15. The system of claim 14, wherein the different types of information systems can be any of the group comprising an admission, discharge and transfer information system, a radiology information system, a cardiology information system and a patient monitor information system.

16. The system of claim 11, wherein the first and the second information systems can generate messages having critical information at least some of which is similar.

17. The system of claim 11, wherein the critical information detector operates to detect a unique identity associated with critical information detected in each message received from an information system.

* * * * *